US011579916B2

(12) United States Patent
Corrie et al.

(10) Patent No.: US 11,579,916 B2
(45) Date of Patent: Feb. 14, 2023

(54) EPHEMERAL STORAGE MANAGEMENT FOR CONTAINER-BASED VIRTUAL MACHINES

(71) Applicant: VMware, Inc., Palo Alto, CA (US)

(72) Inventors: Benjamin J. Corrie, Woodinville, WA (US); Abhishek Srivastava, Sunnyvale, CA (US); Adrian Drzewiecki, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 269 days.

(21) Appl. No.: 16/838,542

(22) Filed: Apr. 2, 2020

(65) Prior Publication Data
US 2021/0311759 A1 Oct. 7, 2021

(51) Int. Cl.
*G06F 16/13* (2019.01)
*G06F 9/455* (2018.01)

(52) U.S. Cl.
CPC .......... *G06F 9/45558* (2013.01); *G06F 16/13* (2019.01); *G06F 2009/45583* (2013.01)

(58) Field of Classification Search
CPC ................ G06F 9/45558; G06F 16/13; G06F 2009/45583
See application file for complete search history.

(56) References Cited

U.S. PATENT DOCUMENTS

| | | | |
|---|---|---|---|
| 10,303,669 B1 * | 5/2019 | Stephens | G06F 16/188 |
| 2014/0195484 A1 * | 7/2014 | Wang | G06F 11/1484 |
| | | | 707/624 |
| 2017/0235507 A1 * | 8/2017 | Sinha | G06F 11/2069 |
| | | | 711/114 |
| 2017/0344462 A1 * | 11/2017 | Vecera | G06F 16/51 |
| 2017/0371693 A1 | 12/2017 | Corrie et al. | |
| 2018/0365281 A1 * | 12/2018 | Patel | G06F 16/13 |
| 2019/0034454 A1 * | 1/2019 | Gangumalla | G06F 16/185 |
| 2019/0188279 A1 * | 6/2019 | Christiansen | G06F 16/13 |
| 2019/0236316 A1 * | 8/2019 | Watkins | G06F 16/152 |
| 2020/0026781 A1 * | 1/2020 | Khot | G06F 16/164 |

(Continued)

OTHER PUBLICATIONS

Ernst, E. et al. "Kata Containers Architecture," GitHub, Inc., 2019, 22 pages, URL: https://github.com/kata-containers/documentation/blob/master/design/architecture.md.

(Continued)

*Primary Examiner* — Eliyah S. Harper
(74) *Attorney, Agent, or Firm* — Kim & Stewart LLP

(57) ABSTRACT

A virtualized computing system includes: a host cluster including hosts executing a virtualization layer on hardware platforms thereof, the virtualization layer configured to support execution of virtual machines (VMs), the VMs including a pod VM, the pod VM including a container engine configured to support execution of containers in the pod VM, the pod VM including a first virtual disk attached thereto; and an orchestration control plane integrated with the virtualization layer, the orchestration control plane including a master server in communication with a pod VM controller, the pod VM controller configured to execute in the virtualization layer external to the VMs and cooperate with a pod VM agent in the pod VM, the pod VM agent generating root directories for the containers in the pod VM, each of the root directories comprising a union a read/write ephemeral layer stored on the first virtual disk and a read-only layer.

20 Claims, 9 Drawing Sheets

(56) References Cited

U.S. PATENT DOCUMENTS

| | | | | |
|---|---|---|---|---|
| 2020/0104385 A1* | 4/2020 | Zheng | ................ | G06F 9/45558 |
| 2020/0110695 A1* | 4/2020 | Maciel | ................ | G06F 11/3688 |
| 2020/0285611 A1* | 9/2020 | George | ................ | G06F 16/289 |
| 2020/0409921 A1* | 12/2020 | Starks | ................... | G06F 9/5077 |

OTHER PUBLICATIONS

VMWARE, Inc. "Overview of vSphere Integrated Containers," Product version: 1.5, 2019, 21 pages.
U.S. Appl. No. 16/751,529, filed Jan. 24, 2020, 48 pages.

* cited by examiner

EPHEMERAL STORAGE MANAGEMENT FOR CONTAINER-BASED VIRTUAL MACHINES

Applications today are deployed onto a combination of virtual machines (VMs), containers, application services, and more. For deploying such applications, a container orchestration platform known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into logical unit called "pods" that execute on nodes. Containers in the same pod share the same resources and network and maintain a degree of isolation from containers in other pods. The pods are distributed across nodes of the Kubernetes system. A node exposes a filesystem to a pod that has container image(s) for the container(s) executing therein. By default, data written to the filesystem by containers is ephemeral in that the data lasts only as long as the lifespan of the pod. Ephemeral data persists across container restarts, but once the pod reaches a phase of either succeeded or failed, the ephemeral data is no longer accessible through Kubernetes APIs.

In a conventional Kubernetes system, each node comprises a host operating system (OS) executing on a hardware platform, such as Linux®. A container engine (e.g., Docker®) executes on the host OS, which supports the containers of the pods. Thus, a node includes multiple containers and control plane components executing on a shared OS. Such a configuration results in security and isolation risks, since a single container can consume all the resources of the node, starving other containers for resources. Further, a vulnerability in one container can escape the container and infect other containers or control plane components running on the shared OS. A Kubernetes system can operate on a virtualized computing system in various configurations that mitigate security and isolation risks of the shared host OS. However, such virtualized configurations necessitate a change in ephemeral storage management from that used with a host OS configuration.

SUMMARY

In an embodiment, a virtualized computing system includes: a host cluster including hosts executing a virtualization layer on hardware platforms thereof, the virtualization layer configured to support execution of virtual machines (VMs), the VMs including a pod VM, the pod VM including a container engine configured to support execution of containers in the pod VM, the pod VM including a first virtual disk attached thereto; and an orchestration control plane integrated with the virtualization layer, the orchestration control plane including a master server in communication with a pod VM controller, the pod VM controller configured to execute in the virtualization layer external to the VMs and configured to cooperate with a pod VM agent in the pod VM, the pod VM agent configured to generate root directories for the containers in the pod VM, each of the root directories comprising a union a read/write ephemeral layer and a read-only layer, the read/write ephemeral layer of each of the root directories stored on the first virtual disk.

In another embodiment, a method of managing ephemeral storage for containers executing in a virtualized computing system is described. The virtualized computing system includes an orchestration control plane and a host cluster, the host cluster having hosts executing a virtualization layer on hardware platforms thereof, the virtualization layer configured to support execution of virtual machines (VMs), the orchestration control plane including a master server in communication with a pod VM controller, the pod VM controller configured to execute in the virtualization layer external to the VMs. The method includes: identifying, by the pod VM controller, deployment of a pod VM of the VMs, the pod VM including a container engine configured to support execution of the containers in the pod VM, the pod VM including a first virtual disk attached thereto, the pod VM including a pod VM agent configured to cooperate with the pod VM controller; and generating, by the pod VM agent, root directories for the containers in the pod VM, each of the root directories comprising a union of a read/write ephemeral layer and a read-only layer, the read/write ephemeral layer for each of the root directories stored on the first virtual disk.

Further embodiments include a non-transitory computer-readable storage medium comprising instructions that cause a computer system to carry out the above methods.

DETAILED DESCRIPTION

Techniques for providing ephemeral storage management for container-based virtual machines (VMs) are described. In embodiments described herein, a virtualized computing system includes a cluster of physical servers ("hosts") referred to as a "host cluster." The host cluster includes a virtualization layer, executing on host hardware platforms of the hosts, which supports execution of virtual machines VMs. A virtualization management server manages the host cluster, the virtualization layer, and the VMs executing thereon. The virtualization management server, together with storage and network management systems, forms a virtual infrastructure (VI) control plane of the virtualized computing system. The host cluster is the data plane, which supports execution of workloads in VMs to implement various applications. Together, host cluster(s) and VI control plane(s) comprise a software-defined data center (SDDC).

In embodiments, the virtualization layer of the host cluster and the VI control plane are integrated with an orchestration control plane that supports an application management system, such as a Kubernetes system. This integration enables the host cluster as a "supervisor cluster" that uses VMs to implement nodes of a Kubernetes system. Kubernetes pods are instantiated as "pod VMs," each of which includes a kernel and container engine that supports execution of containers of a Kubernetes pod. In embodiments, the Kubernetes system of the supervisor cluster is extended to support custom objects in addition to pods, such as VM objects that are implemented using native VMs (as opposed to pod VMs). A VI administrator (VI admin) can enable a host cluster as a supervisor cluster and provide its functionality to development teams.

In embodiments, the supervisor cluster compartmentalizes container ephemeral state from container persistent state. In a supervisor cluster, there is the potential for multiple containers executing in a single pod VM. Further, a user can specify reservations/limits that are applicable to container ephemeral storage and must be applied when the ephemeral storage is presented to the containers. In some cases, it is desirable to provide access to the ephemeral storage even after the pod has terminated (e.g., to check logs in case the pod terminated with an error). The techniques described herein size and mount ephemeral storage in a pod VM for use by the containers executing therein. The filesystem of the ephemeral storage can be configured to enforce quotas based on defined reservations/limits. A guest layered filesystem is utilized for mounting the ephemeral storage as a read-write layer on top of the read-only container image layers. In embodiments, the ephemeral storage is made available to the user even after a pod VM has terminated (e.g., for accessing logs). These and further advantages and aspects of the disclosed techniques are described below with respect to the drawings.

Figure 1:
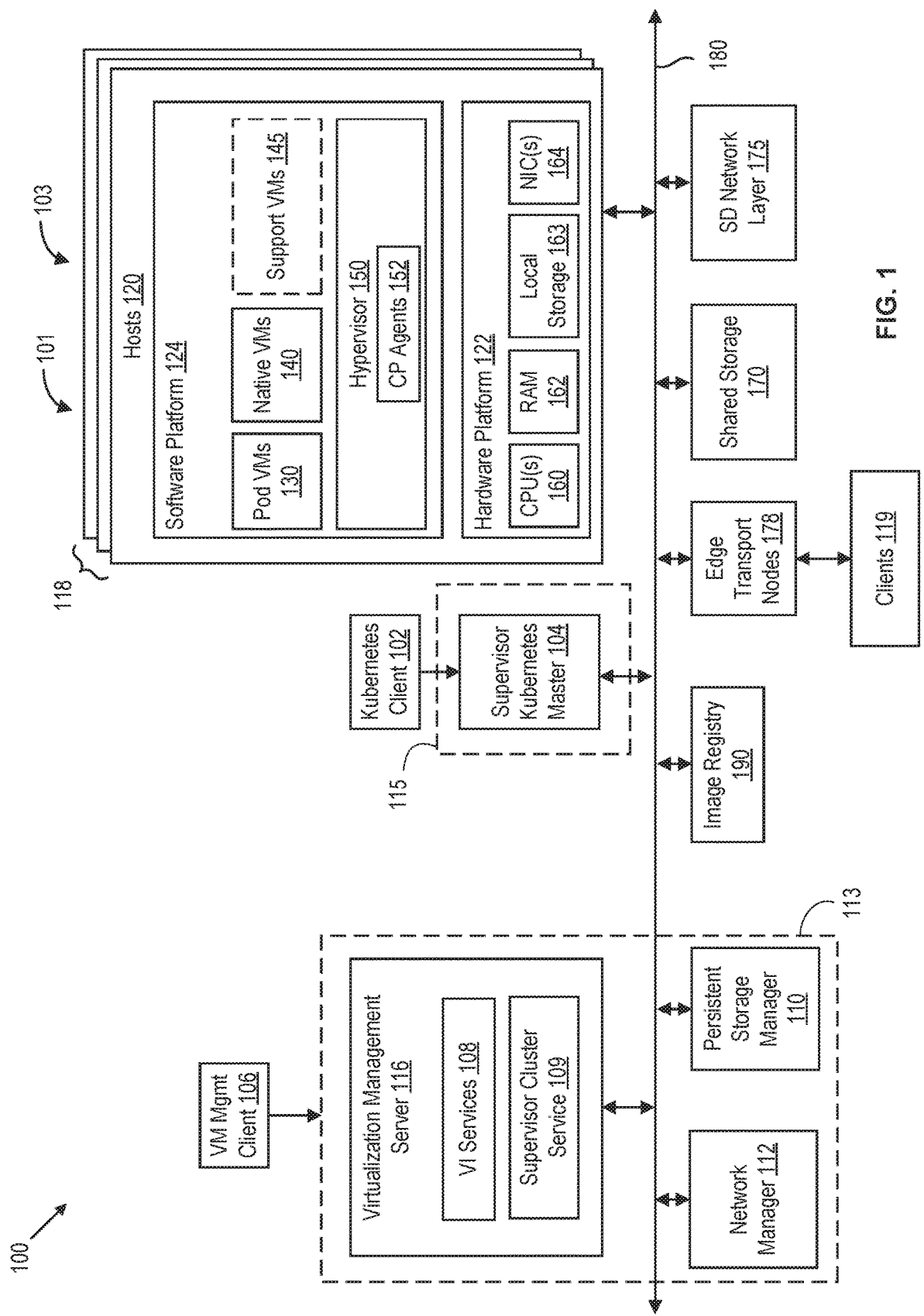
FIG. 1 is a block diagram of a virtualized computing system in which embodiments may be implemented.

FIG. 1 is a block diagram of a virtualized computing system 100 in which embodiments may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162, one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a network 180. Network 180 is a physical network that enables communication between hosts 120 and between other components and hosts 120 (other components discussed further herein).

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (VSAN), which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, Calif. In the example of FIG. 1, host cluster 118 is enabled as a "supervisor cluster," described further herein, and thus VMs executing on each host 120 include pod VMs 130 and native VMs 140. A pod VM 130 is a virtual machine that includes a kernel and container engine that supports execution of containers, as well as an agent (referred to as a pod VM agent) that cooperates with a controller of orchestration control plane 115 executing in hypervisor 150 (referred to as a pod VM controller). An example of pod VM 130 is described further below with respect to FIG. 2. Some VMs 130/140, shown as support VMs 145, have specific functions within host cluster 118. For example, support VMs 145 can provide control plane functions, edge transport functions, and the like. An embodiment of software platform 124 is discussed further below with respect to FIG. 2.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., the public Internet). Edge transport nodes 178 can include a gateway/router between the internal logical networking of host cluster 118 and the external network. Edge transport nodes 178 can be physical servers or VMs. For example, edge transport nodes 178 can be implemented in support VMs 145 and include a gateway/router of SD network layer 175. Various clients 119 can access respective components in virtualized computing system through edge transport nodes 178 (including VM management client 106 and Kubernetes client 102, which as logically shown as being separate by way of example).

Virtualization management server 116 is a physical or virtual server that manages host cluster 118 and the virtualization layer therein. Virtualization management server 116 installs a control plane (CP) agent ("CP agent 152") in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualization management server 116 further enables host cluster 118 as a supervisor cluster 101. Virtualization management server 116 installs additional CP agents 152 in hypervisor 150 to add host 120 to supervisor cluster 101. Supervisor cluster 101 integrates an orchestration control plane 115 with host cluster 118. In embodiments, orchestration control plane 115 includes software components that integrate an application management system, such as a Kubernetes system, with host cluster 118 and the VI control plane managing host cluster 118. Byway of example, a Kubernetes system is described herein. In supervisor cluster 101, hosts 120 become nodes of the Kubernetes system Virtualization management server 116 provisions one or more virtual servers as "master servers," which function as management entities and execute on control nodes of the Kubernetes system. In the embodiment of FIG. 1, supervisor cluster 101 includes a supervisor Kubernetes master 104 that functions as such a master server. For purposes of clarity, supervisor Kubernetes master 104 is shown as a separate logical entity. For practical implementations, supervisor Kubernetes master 104 can be implemented as VM(s) 130/140 in host cluster 118. Further, although only one supervisor Kubernetes master 104 is shown, supervisor cluster 101 can include more than one supervisor Kubernetes master 104 in a logical cluster for redundancy and load balancing. Orchestration control plane 115 includes custom controllers, custom plugins, scheduler extenders, and the like executing in supervisor Kubernetes master 104, as well as services executing in the VI control plane, which together enable the Kubernetes system to deploy applications on VMs 130/140 of host cluster 118.

In an embodiment, virtualized computing system 100 further includes a persistent storage manager 110. Persistent storage manager 110 is a physical or virtual server that provisions virtual disks in shared storage 170 (including a VSAN formed from local storage 163) as independent and persistent volumes That is, virtual disks that persist apart from the lifecycle of any VM or container. Various components can interact with persistent storage manager 110 to provision persistent volumes, such as virtualization management server 116 and supervisor Kubernetes master 104. Persistent storage manager 110 can operate independently from virtualization management server 116 (e.g., as an independent physical or virtual server). Alternatively, persistent storage manager 110 can be a service in virtualization management server 116.

In an embodiment, virtualized computing system 100 further includes a network manager 112. Network manager 112 is a physical or virtual server that manages logical network services of SD network layer 175. In an embodiment, network manager 112 comprises one or more virtual servers deployed as VMs. Network manager 112 installs additional control plane agents 152 and data plane (DP) modules in hypervisor 150 to add a host 120 as a managed entity, referred to as a transport node. In this manner, host cluster 118 can be a cluster 103 of transport nodes. One example logical network platform that can be configured and used in embodiments described herein as network manager 112 and SD network layer 175 is a VMware NSX® platform made commercially available by VMware, Inc. of Palo Alto, Calif.

In an embodiment, system 100 further includes an image registry 190. As described herein, containers of supervisor cluster 101 execute in pod VMs 130. The containers in pod VMs 130 are spun up from container images managed by image registry 190. Image registry 190 manages images and image repositories.

Virtualization management server 116, network manager 112, and persistent storage manager 110 comprise a virtual infrastructure (VI) control plane 113 for host cluster 118, shared storage 170, and SD network layer 175. Virtualization management server 116 can supervisor cluster service 109 and VI services 108. VI services 108 include various virtualization management services, such as a distributed resource scheduler (DRS), high-availability (HA) service, single sign-on (SSO) service, virtualization management daemon, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure sufficient resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

Supervisor cluster service 109 enables host cluster 118 as supervisor cluster 101. Supervisor cluster service 109 deploys the components of orchestration control plane 115.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, deploy and manage image registry 190, and the like.

Kubernetes client 102 represents an input interface for a user to supervisor Kubernetes master 104. Kubernetes client 102 is commonly referred to as kubectl. Through Kubernetes client 102, a user submits desired states of the Kubernetes system, e.g., as YAML documents, to supervisor Kubernetes master 104. In embodiments, the user submits the desired states within the scope of a supervisor namespace. A "supervisor namespace" is a shared abstraction between VI control plane 113 and orchestration control plane 115. Each supervisor namespace provides resource-constrained and authorization-constrained units of multi-tenancy. A supervisor namespace provides resource constraints, user-access constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD network layer 175). User-access constraints include definitions of users, roles, permissions, bindings of roles to users, and the like. Each supervisor namespace is expressed within orchestration control plane 115 using a namespace native to orchestration control plane 115 (e.g., a Kubernetes namespace or generally a "native namespace"), which allows users to deploy applications in supervisor cluster 101 within the scope of supervisor namespaces. In this manner, the user interacts with supervisor Kubernetes master 104 to deploy applications in supervisor cluster 101 within defined supervisor namespaces.

Figure 2:
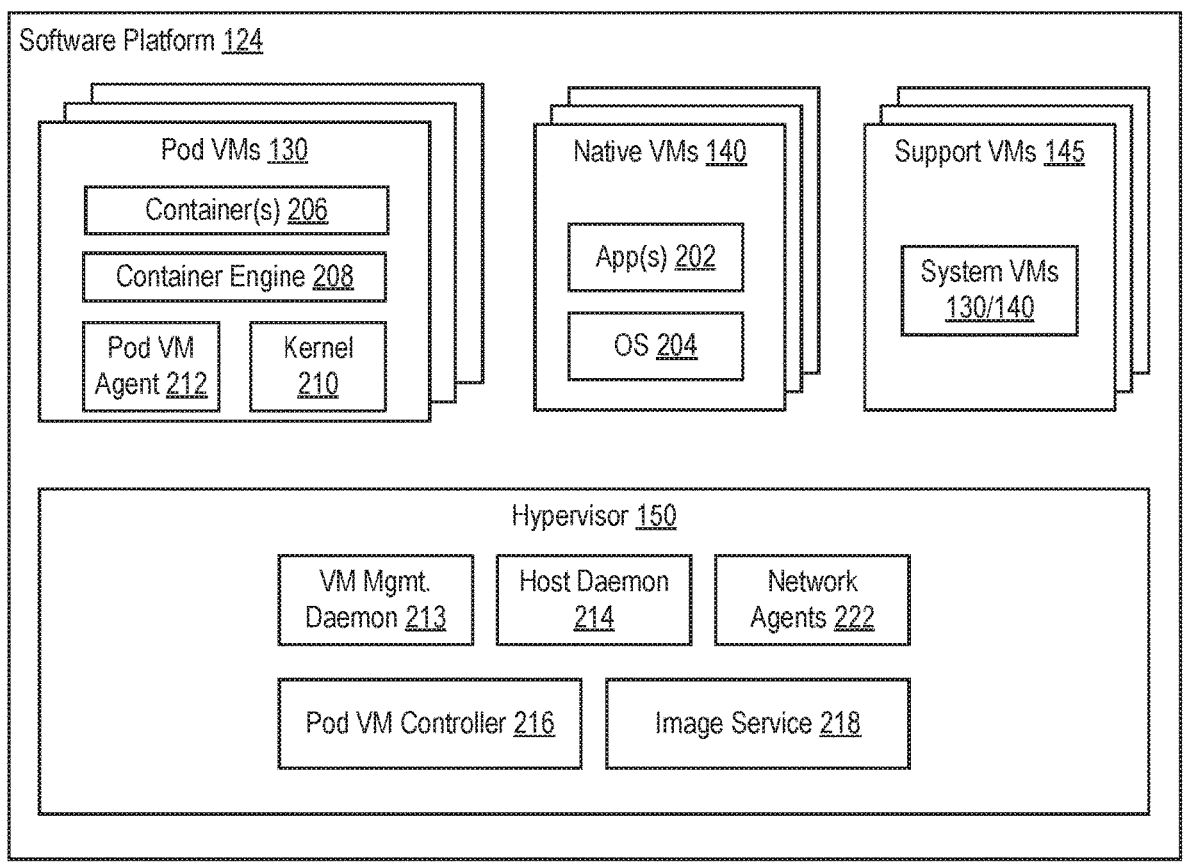
FIG. 2 is a block diagram depicting software platform according an embodiment.

FIG. 2 is a block diagram depicting software platform 124 according an embodiment. As described above, software platform 124 of host 120 includes hypervisor 150 that supports execution of VMs, such as pod VMs 130, native VMs 140, and support VMs 145. In an embodiment, hypervisor 150 includes a VM management daemon 213, a host daemon 214, a pod VM controller 216, an image service 218, and network agents 222. VM management daemon 213 is a control plane agent 152 installed by virtualization management server 116. VM management daemon 213 provides an interface to host daemon 214 for virtualization management server 116. Host daemon 214 is configured to create, configure, and remove VMs (e.g., pod VMs 130 and native VMs 140).

Pod VM controller 216 is a control plane agent 152 of orchestration control plane 115 for supervisor cluster 101 and allows supervisor Kubernetes master 104 to interact with hypervisor 150. Pod VM controller 216 configures the respective host as a node in supervisor cluster 101. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured. Pod VM controller 216 is omitted if host cluster 118 is not enabled as a supervisor cluster 101.

Image service 218 is configured to pull container images from image registry 190 and store them in shared storage 170 such that the container images can be attached and mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images. Image service 218 communicates with pod VM controller 216 during spin-up and configuration of pod VMs 130. In some embodiments, image service 218 is part of pod VM controller 216. In embodiments, image service 218 utilizes system VMs 130/140 in support VMs 145 to fetch images, convert images to container image virtual disks, and cache container image virtual disks in shared storage 170.

Network agents 222 comprises control plane agents 152 installed by network manager 112. Network agents 222 are configured to cooperate with network manager 112 to implement logical network services Network agents 222 configure the respective host as a transport node in a cluster 103 of transport nodes.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux® kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd. Pod VMs 130 are omitted if host cluster 118 is not enabled as a supervisor cluster 101.

Figure 3:
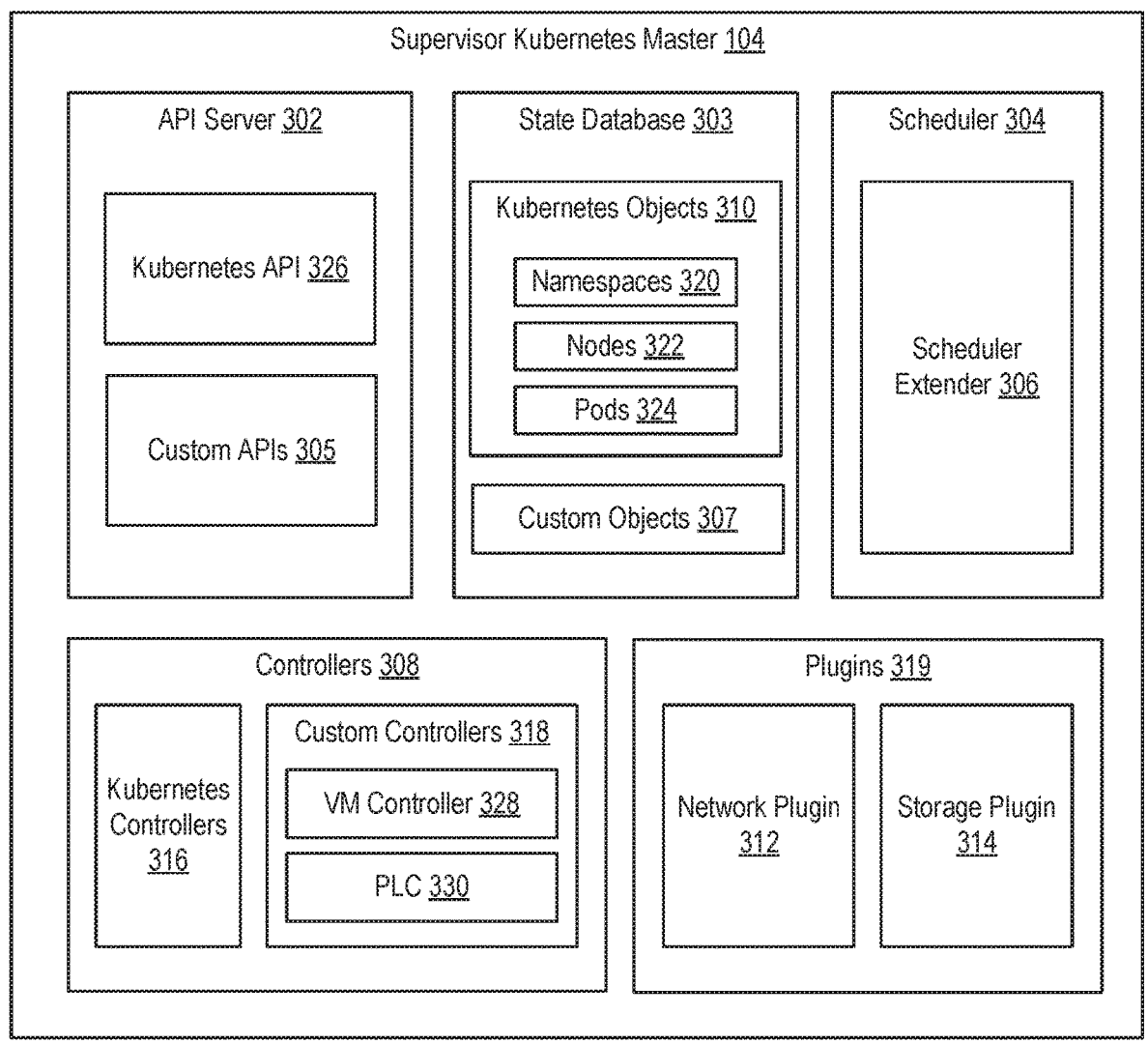
FIG. 3 is a block diagram of a supervisor Kubernetes master according to an embodiment.

FIG. 3 is a block diagram of supervisor Kubernetes master 104 according to an embodiment. Supervisor Kubernetes master 104 includes application programming interface (API) server 302, a state database 303, a scheduler 304, a scheduler extender 306, controllers 308, and plugins 319 (e.g., a storage plugin, a network plugin, etc.). API server 302 includes the Kubernetes API server, kube-api-server ("Kubernetes API 326") and custom APIs 305. Custom APIs 305 are API extensions of Kubernetes API 326 using either the custom resource/operator extension pattern or the API extension server pattern. Custom APIs 305 are used to create and manage custom resources, such as VM objects. API server 302 provides a declarative schema for creating, updating, deleting, and viewing objects.

State database 303 stores the state of supervisor cluster 101 (e.g., etcd) as objects created by API server 302. A user can provide application specification data to API server 302 that defines various objects supported by the API (e.g., as a YAML document). The objects have specifications that represent the desired state. State database 303 stores the objects defined by application specification data as part of the supervisor cluster state. Standard Kubernetes objects ("Kubernetes objects 310") include namespaces 320, nodes 322, and pods 324 among others. Custom objects 307 are resources defined through custom APIs 305 (e.g., VM objects, guest cluster objects). Namespaces 320 provide scope for objects. Namespaces are objects themselves maintained in state database 303. A namespace can include resource quotas, limit ranges, role bindings, and the like that are applied to objects declared within its scope. VI control plane 113 creates and manages supervisor namespaces for supervisor cluster 101. A supervisor namespace is a resource-constrained and authorization-constrained unit of multi-tenancy managed by virtualization management server 116. Namespaces 320 inherit constraints from corresponding supervisor cluster namespaces.

Controllers 308 can include, for example, standard Kubernetes controllers ("Kubernetes controllers 316") (e.g., kube-controller-manager controllers, cloud-controller-manager controllers, etc.) and custom controllers 318. Custom controllers 318 include controllers for managing lifecycle of Kubernetes objects 310 and custom objects 307. For example, custom controllers 318 can include a VM controller 328 configured to manage custom VM objects and a pod VM lifecycle controller (PLC) 330 configured to manage pods 324. A controller 308 tracks objects in state database 303 of at least one resource type. Controller(s) 308 are responsible for making the current state of supervisor cluster 101 come closer to the desired state as stored in state database 303. A controller 308 can carry out action(s) by itself, send messages to API server 302 to have side effects, and/or interact with external systems.

Scheduler 304 watches state database 303 for newly created pods with no assigned node. A pod is an object supported by API server 302 that is a group of one or more containers, with network and storage, and a specification on how to execute. Scheduler 304 selects candidate nodes in supervisor cluster 101 for pods. Scheduler 304 cooperates with scheduler extender 306, which interfaces with virtualization management server 116. Scheduler extender 306 cooperates with virtualization management server 116 (e.g., such as with DRS) to select nodes from candidate sets of nodes and provide identities of hosts 120 corresponding to the selected nodes. For each pod, scheduler 304 also converts the pod specification to a pod VM specification, and scheduler extender 306 asks virtualization management server 116 to reserve a pod VM on the selected host 120. Scheduler 304 updates pods in state database 303 with host identifiers.

Kubernetes API 326, state database 303, scheduler 304, and Kubernetes controllers 316 comprise standard components of a Kubernetes system executing on supervisor cluster 101. Custom controllers 318, plugins 319, and scheduler extender 306 comprise custom components of orchestration control plane 115 that integrate the Kubernetes system with host cluster 118 and VI control plane 113.

Figure 4:
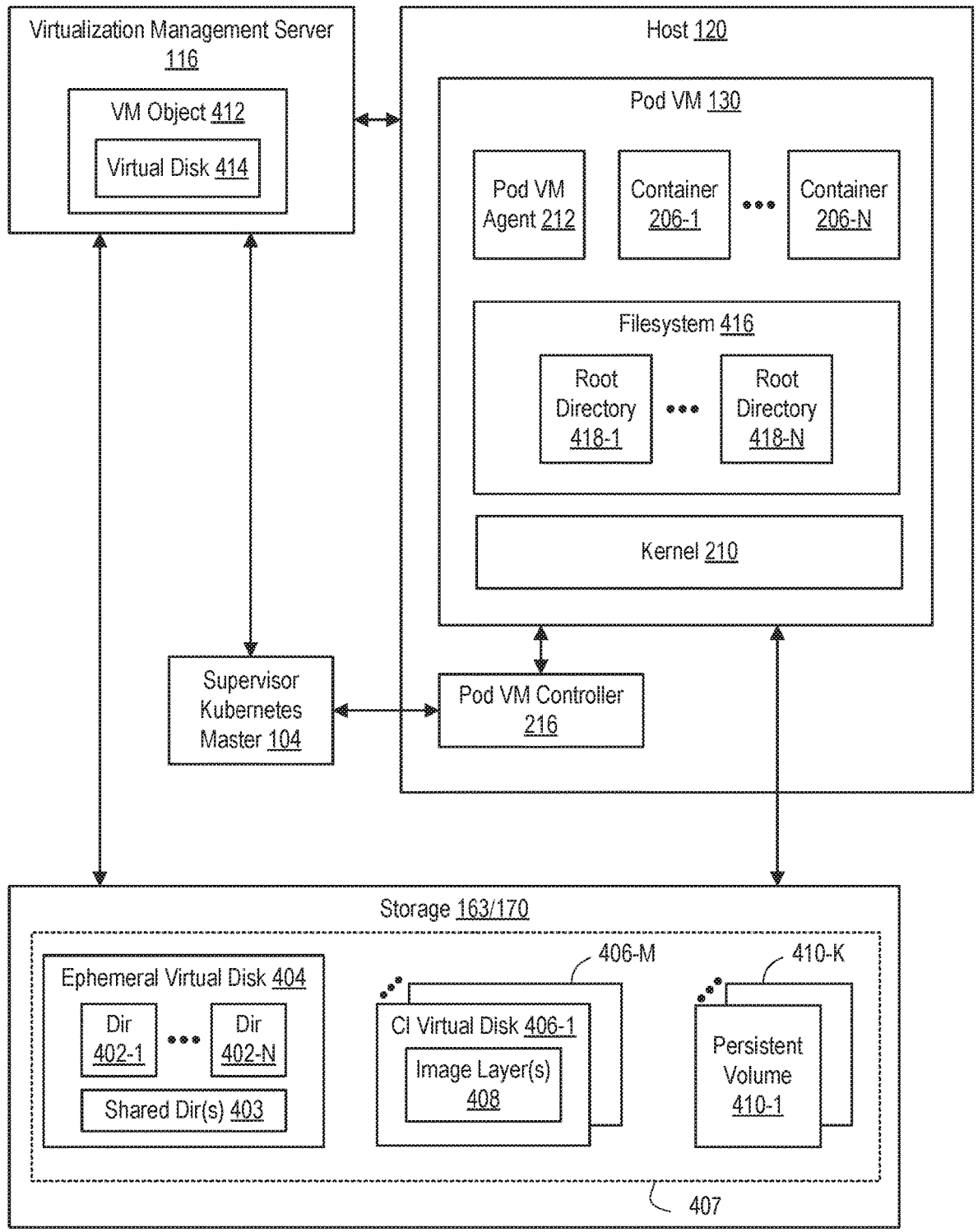
FIG. 4 is a block diagram depicting a logical view of container storage management in a supervisor cluster according to an embodiment.

FIG. 4 is a block diagram depicting a logical view of container storage management in a supervisor cluster according to an embodiment. As show, a host 120 includes a pod VM 130 having containers 206-1 . . . 206-N executing therein, where N is an integer greater than zero ("containers 206") Pod VM 130 also includes pod VM agent 212, as discussed above, which functions as an agent of pod VM controller 216. Kernel 210 of pod VM 130 provides a filesystem 416. Filesystem 416 includes root directories 418-1 . . . 418-N ("root directories 418") associated with containers 206-1 . . . 206-N, respectively. Pod VM controller 216 configures pod VM 130 with root directories 418, as described further below.

Storage 163/170 stores ephemeral virtual disk 404, container image (CI) virtual disks 406-1 . . . 406-M, and persistent volumes 410-1 . . . 410-K, where M and K are integers greater than zero ("CI virtual disks 406" and "persistent volumes 410"). Ephemeral virtual disk 404, CI virtual disks 406, and persistent volumes 410 form storage set 407 for a pod VM 130. Each pod VM 130 in supervisor cluster 101 is associated with its own storage set 407. For one or more pod VMs 130, persistent volumes 410 can be omitted from storage set 407 (e.g., containers 206 in a pod VM 130 may not require persistent storage).

In embodiments, supervisor Kubernetes master 104 is in communication with both virtualization management server 116 and pod VM controller 216. Supervisor Kubernetes master 104 cooperates with virtualization management server 116 to create and deploy pod VM 130, create ephemeral virtual disk 404, and attach ephemeral virtual disk 404 to pod VM 130. Virtualization management server 116 manages a VM object 412 representing pod VM 130, and a virtual disk object 414 representing ephemeral virtual disk 404. Virtualization management server 116 can provision ephemeral virtual disk 404 to shared storage 170 or local storage 163 (e.g., local storage 163 only accessible by host 120).

In embodiments, ephemeral virtual disk 404 provides ephemeral storage to all containers 206 in pod VM 130 (i.e., one virtual disk for many containers). Pod VM controller 216 is configured to mount ephemeral virtual disk 404 in pod VM 130 and format ephemeral virtual disk 404. In embodiments, ephemeral storage for containers 206 is logically separated using directories 402-1 . . . 402-N ("directories 402") in the filesystem of ephemeral virtual disk 404. Thus, each container's local ephemeral data is stored in a separate directory 402 on ephemeral virtual disk 404. In embodiments, the filesystem of ephemeral virtual disk 404 can include one or more shared directories 403 for storing ephemeral data shared among containers 206 (e.g., Kubernetes EmptyDir volumes).

As discussed above, image service 218 (FIG. 2) is configured to fetch container images for containers 206 and provision CI virtual disks 406 that store the container images Each CI virtual disk 406 stores one or more image layers 408 of one container image. A CI virtual disk 406 can be used by more than one container 206 (in the same pod VM 130 or in a different pod VM) so, in general, M does not equal N. For example, one or more of containers 206 can be spun up from the same container image stored in one CI virtual disk 406. Pod VM controller 216 configures pod VM 130 with root directories 418. Each root directory 418 is formed by layering read/write ephemeral storage over a read-only container image directory tree using a union filesystem, such as aufs, overlayFS, or the like. All writes by an xth container 206-x ($1 \leq x \leq N$) persist to a respective directory 402-x or to a shared directory 403. Any files to be modified in the read-only container image directory tree are copied up to the read/write ephemeral storage and then modified.

Figure 5:
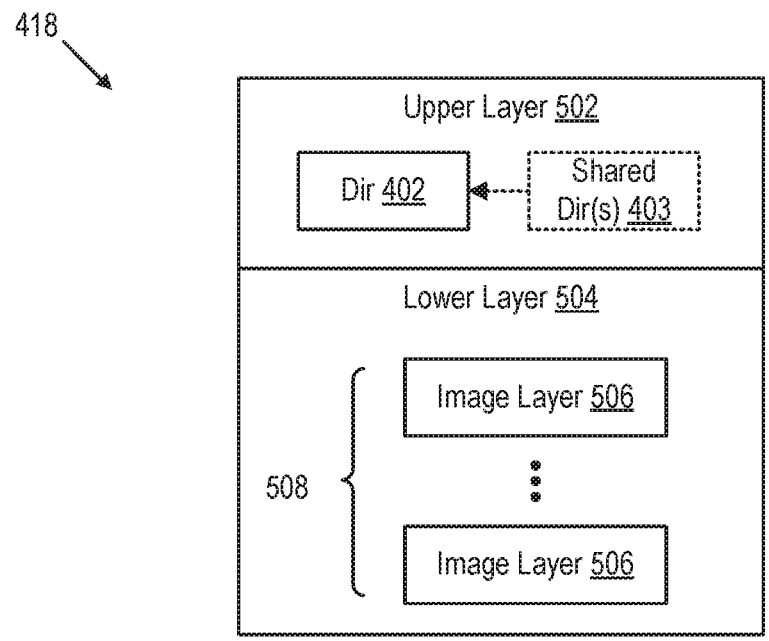
FIG. 5 is a block diagram depicting a logical structure of a root directory for a container according to an embodiment.

FIG. 5 is a block diagram depicting a logical structure of a root directory 418 for a container 206 according to an embodiment. Root directory 418 is a directory merged from an upper layer 502 and a lower layer 504. Upper layer 502 is a read/write layer and stores ephemeral data of a container in a directory 402 on ephemeral virtual disk 404. Lower layer 504 is a read-only layer that stores image layer(s) 506 of a container image. Image layer(s) 506 are layered to form a directory tree 508. Directory 402 is layered on top of directory tree 508 to form root directory 418. In some embodiments, upper layer 502 can also store ephemeral data in one or more shared directories 403 on ephemeral virtual disk 404. If upper layer 502 does not support more than one directory tree, shared dir(s) 403 can be linked into directory 402.

Figure 6:
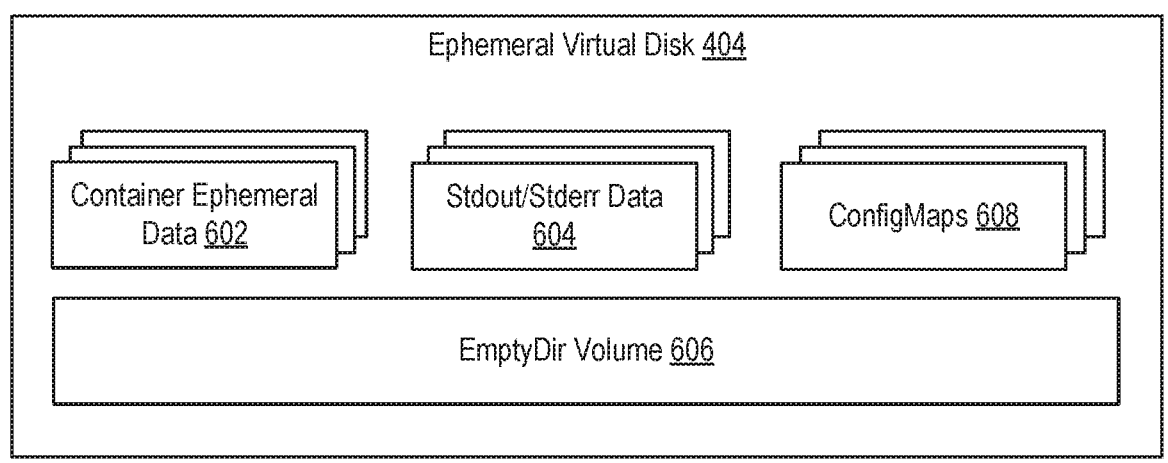
FIG. 6 is a block diagram depicting the types of ephemeral data utilized by containers executing in a pod VM according to an embodiment.

FIG. 6 is a block diagram depicting the types of ephemeral data utilized by containers executing in a pod VM according to an embodiment. Ephemeral virtual disk 404 can store container ephemeral data 602, which includes data local to each container 206 in pod VM 130. Ephemeral virtual disk 404 can store container stdout/stderr data generated during operation (local to each container 206 in pod VM 130). Ephemeral virtual disk 404 can store configuration data 608 (e.g., Kubernetes ConfigMap data) local to each container 206 in pod VM 130. Ephemeral virtual disk 404 can store shared ephemeral data 606 (e.g., Kubernetes EmptyDir volume data) shared among containers 206 in pod VM 130. Those skilled in the art will appreciate that ephemeral virtual disk 404 can store other types of ephemeral data for containers executing in a pod VM.

Figure 7:
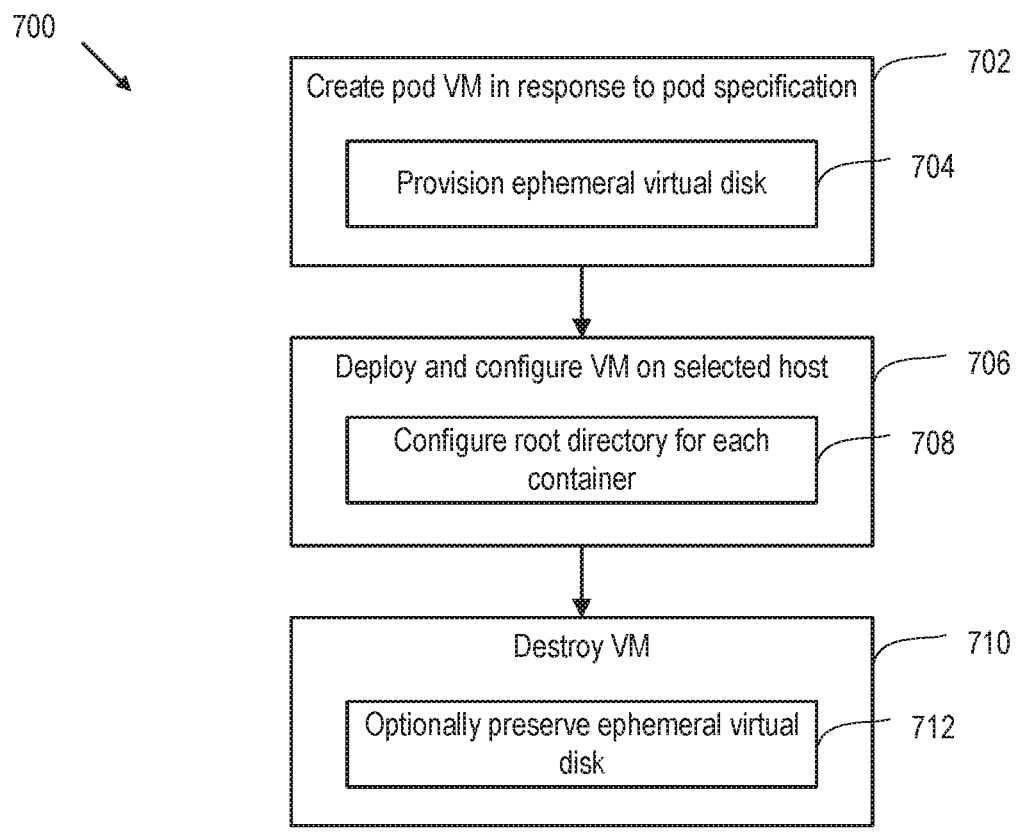
FIG. 7 is a flow diagram depicting a method of managing ephemeral storage for containers executing in a virtualized computing system according to an embodiment.

FIG. 7 is a flow diagram depicting a method 700 of managing ephemeral storage for containers executing in a virtualized computing system according to an embodiment. Method 700 can be performed by VI control plane 113 and orchestration control plane 115 executing on CPU, memory, storage, and network resources managed by a virtualization layer (e.g., a hypervisor) or a host OS.

Method 700 begins at step 702, where supervisor Kubernetes master 104 cooperates with virtualization management server 116 to create a pod VM 130 in response to a pod specification received from a user. For example, a user interacts with supervisor Kubernetes master 104 by submitted a specification (e.g., a YAML document) through API server 302. The specification can include a pod specification either directly or through some other created object (e.g., a deployment, job, ReplicaSet, etc.). Supervisor Kubernetes master 104 interacts with virtualization management server 116 to create VM object 412 for a pod VM 130 that implements the pod specification. During pod VM creation, at step 704, virtualization management server 116 adds virtual disk object 414 for VM object 412 and provisions ephemeral virtual disk 404 for the pod VM.

At step 706, virtualization management server 116 cooperates with hypervisor 150 in a host 120 to deploy pod VM 130, and pod VM controller 216 configures pod VM 130. Virtualization management server 116 calls host daemon 214 to create pod VM 130, which includes ephemeral virtual disk 404. Virtualization management server 116 calls host daemon 214 to power on pod VM 130, during which ephemeral virtual disk 404 is attached to pod VM 130. Pod VM controller 216 notices pod VM 130 has been created and powered on. Pod VM controller 216 configures pod VM 130, which includes, at step 708, configuring a root directory 418 for each container 206 to be executed in pod VM 130.

At step 710, virtualization management server 116 cooperates with hypervisor 150 in host 120 to destroy pod VM 130. For example, either a state change of containers 206 or a state change in supervisor Kubernetes master 104 can cause pod VM 130 to be shut down. In case pod VM 130 is shut down by supervisor Kubernetes master 104, pod VM controller 216 cooperates with pod VM agent 212 to shut down containers 206 and then shut down pod VM agent 212. If containers 206 all exit (with either success or failure), pod VM agent 212 exits, which causes pod VM 130 to shut down. PLC 330 notices pod VM 130 has shut down and that pod VM 130 should be destroyed. PLC 330 cooperates with virtualization management server 116 to destroy pod VM 130. Virtualization management server 116 cooperates with hypervisor 150 (e.g., host daemon 214) to power off pod VM 130 if needed and purge ephemeral virtual disk 404. In some embodiments, at step 712, virtualization management server 116 optionally preserves ephemeral virtual disk 404. Preservation of ephemeral virtual disk 404 can be useful, for example, to analyze container logs (e.g., in case of container(s) exiting with failure). A user can designate during pod creation that the ephemeral storage be preserved. Alternatively, preserving ephemeral storage can be a default setting. In another alternative, ephemeral storage can be preserved in case of a container exiting with a failure. An embodiment of preserving and accessing ephemeral virtual disk 404 after pod VM 130 has been destroyed is discussed below.

Figure 8:
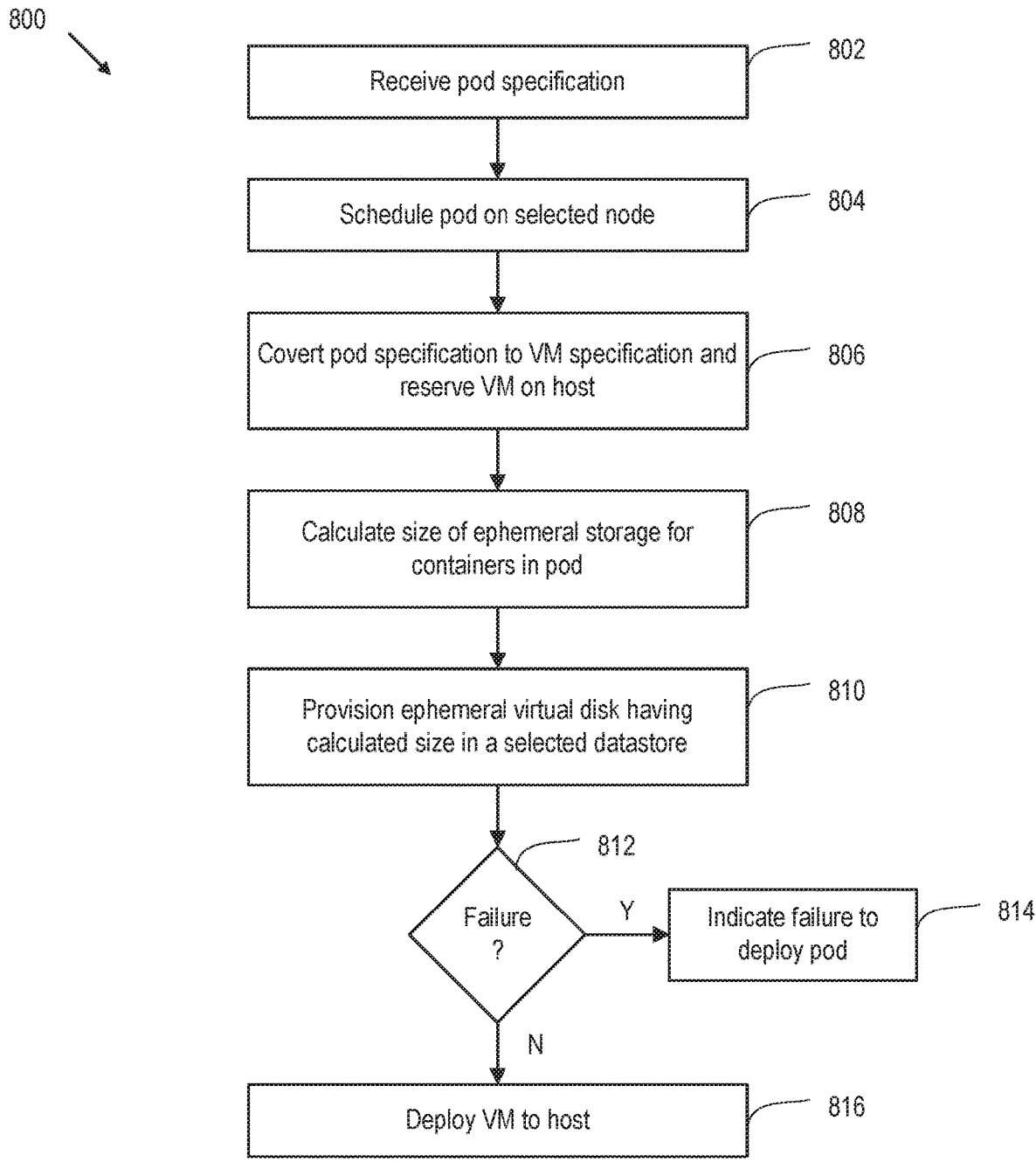
FIG. 8 is a flow diagram depicting a method of deploying a pod VM with ephemeral storage according to an embodiment.

FIG. 8 is a flow diagram depicting a method 800 of deploying a pod VM with ephemeral storage according to an embodiment. Method 800 can be performed by virtualization management server 116 and supervisor Kubernetes master 104 executing on CPU, memory, storage, and network resources managed by a virtualization layer (e.g., a hypervisor) or a host OS. Method 800 can be performed to implement steps 702-706 of method 700 described above.

Method 800 begins at step 802, where supervisor Kubernetes master 104 receives a pod specification (e.g., through a user interacting with API server 302). At step 804, scheduler 304 in supervisor Kubernetes master 104 schedules a pod on a selected node. In embodiments, scheduler 304 selects candidate nodes for deployment of the pod. Scheduler 304 selects the candidate nodes by filtering on affinity, node selector constraints, etc. Scheduler extender 306 cooperates with virtualization management server 116 (e.g., DRS) to select a node from the set of candidate nodes. Virtualization management server 116 selects zero or one node from the list of a plurality of candidate nodes provided by scheduler extender 306.

At step 804, supervisor Kubernetes master 104 converts a pod specification of the pod to a VM specification for a pod VM and cooperates with virtualization management server 116 to reserve a pod VM 130 on a host 120 corresponding to the selected node. In embodiments, scheduler 304 converts the pod specification to a VM specification for a pod VM 130. For example, scheduler 304 converts CPU and memory requests and limits from pod specification to VM specification with fallback to reasonable defaults. The VM specification includes a vNIC device attached to the logical network used by pod VMs 130. The guest OS in VM specification is specified to be kernel 210 with container engine 208. The VM specification includes an ephemeral virtual disk for storing ephemeral data of the containers.

At step 808, supervisor Kubernetes master 104 calculates the size of the ephemeral virtual disk for the VM specification. In an embodiment, the size of the ephemeral virtual disk is determined based on each container's ephemeral storage reservation, each container's ephemeral storage limit, and each container's default ephemeral storage size. For example, the size of the ephemeral virtual disk is at least as large as:

$$\sum_{i=1}^{N} \text{MAX}(reservation_i, limit_i, default_i), \quad \text{Eq. 1}$$

where $reservation_i$ is the ith container's ephemeral storage reservation, $limit_i$ is the ith container's ephemeral storage limit, $default_i$ is the ith container's default ephemeral storage, and N is the number of containers in the pod. In some embodiments, the size of the ephemeral virtual disk is at least as large as Equation 1 plus a pod-wide minimum buffer. In some embodiments, the pod specification can include one or more shared ephemeral volumes (e.g., EmptyDir volumes). In such case, the size of the ephemeral virtual disk is at least as large as Equation 1 plus the size of each shared ephemeral volume plus an optional pod-wide minimum buffer. In some embodiments, the calculated size of the ephemeral virtual disk is rounded up to some power of two.

At step 810, virtualization management server 116 provisions ephemeral virtual disk 404 having the calculated size in a selected datastore. The datastore can be located on shared storage 170 or local storage 163. At step 812, virtualization management server 116 determines if ephemeral virtual disk 404 has been successfully provisioned. If not, method 800 proceeds to step 814, where virtualization management server 116 indicates the failure to supervisor Kubernetes master 104, which indicates a failure to deploy the pod Otherwise, method 800 proceeds to step 816, where virtualization management server 116 deploys pod VM 130 to host 120. Virtualization management server 116 cooperates with hypervisor 150 in host 120 (e.g., through host daemon 214) to create and power on pod VM 130, which by virtue of the VM specification, includes ephemeral virtual disk 404 attached thereto.

Figure 9:
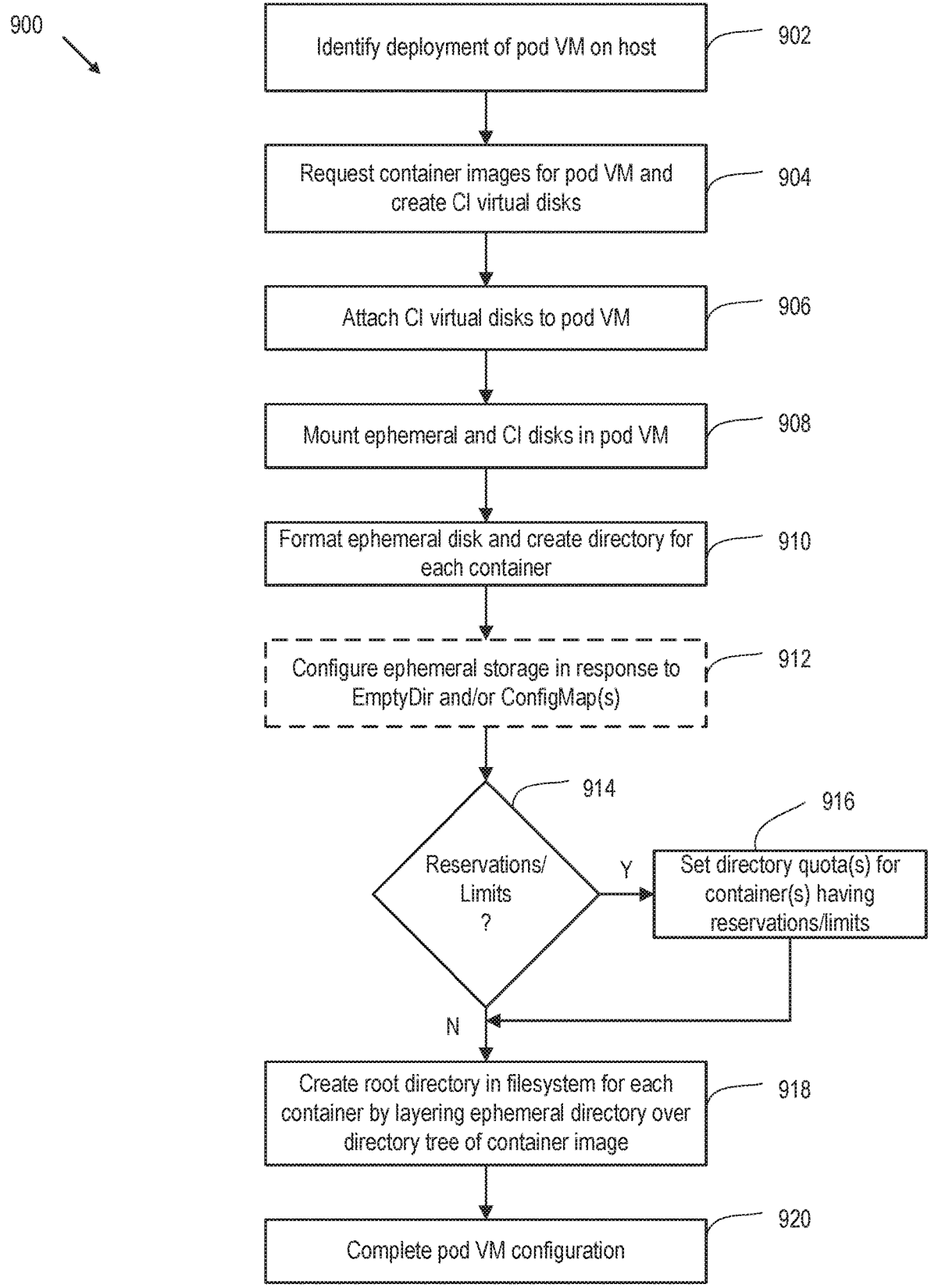
FIG. 9 is a flow diagram depicting a method of configuring a deployed pod VM according to an embodiment.

FIG. 9 is a flow diagram depicting a method 900 of configuring a deployed pod VM according to an embodiment. Method 900 can be performed by pod VM controller 216 and pod VM agent 212 executing in a virtualization layer on CPU, memory, storage, and network resources. Method 900 can be performed to implement steps 706 and 708 of method 700 described above.

Method 900 begins at step 902, where pod VM controller 216 identifies deployment of pod VM 130 on host 120. In embodiments, when pod VM 130 is created and deployed on host 120, virtualization management server 116 returns a VM identifier to supervisor Kubernetes master 104 for pod VM 130. Pod VM controller 216 notices that pod VM 130 has been powered on and a VM identifier exists at supervisor Kubernetes master 104. At step 904, pod VM controller 216 invokes image service 218 to request container images for pod VM 130 from image registry 190. Image service 218 cooperates with image registry 190 to obtain the container images and creates CI virtual disks 406. At step 906, pod VM controller 216 attaches CI virtual disks 406 to pod VM 130.

At step 908, pod VM agent 212 mounts ephemeral virtual disk 404 and CI virtual disks 406 in pod VM 130. At step 910, pod VM agent 212 formats ephemeral virtual disk 404 and creates a directory 402 for each container. In embodiments, at step 912, pod VM agent 212 configures ephemeral virtual disk 404 in response to shared ephemeral volume(s) (e.g., EmptyDir(s)) and/or configuration metadata (e.g., ConfigMap(s)). Pod VM agent 212 creates a shared directory 403 for each shared ephemeral volume (if any). Pod VM agent 212 stores configuration metadata 608 for each container (if any) in the container's respective directory 402 on ephemeral virtual disk 404. Pod VM agent 212 can perform steps 908-912 by interacting with kernel 210.

At step 914, pod VM agent 212 determines if any container has a reservation/limit on ephemeral storage. If so, method 900 proceeds to step 916. Otherwise, method 900 proceeds to step 918. At step 916, pod VM agent 212 sets directory quota(s) for container(s) having reservation/limits. In an embodiment, pod VM agent 212 formats ephemeral virtual disk 404 at step 910 with a filesystem capable of setting quotas per directory. One example filesystem having this capability is XFS. Containers having reservation/limits can have those constraints expressed in a quota applied to their respective directory 402 on ephemeral virtual disk 404. Pod VM agent 212 can perform step 916 by interacting with kernel 210.

At step 918, pod VM agent 212 creates a root directory 418 in filesystem 416 of pod VM 130 for each container 206 by layering respective ephemeral storage (e.g., a respective directory 402) on ephemeral virtual disk 404 on top of the directory tree of a respective container image on a CI virtual disk 406. Pod VM agent 212 invokes mount commands of kernel 210 using a union file system of kernel 210 to create root directories 418 (e.g., aufs, overlayFS, and the like). Pod VM agent 212 can perform step 918 by interacting with kernel 210. At step 920, pod NM controller 216 completes configuration of pod VM 130. For example, pod VM controller 216 can configure networking, swap storage, start pod VM agent 212, and the like. As described above, pod VM agent 212 functions as an agent of pod VM controller 216. In embodiments, pod VM controller 216 can perform steps 908-918 by cooperating with pod VM agent 212. Alternatively, pod VM agent 212 can perform one or more of steps 908-918 autonomously after being started by pod VM controller 216.

Figure 10:
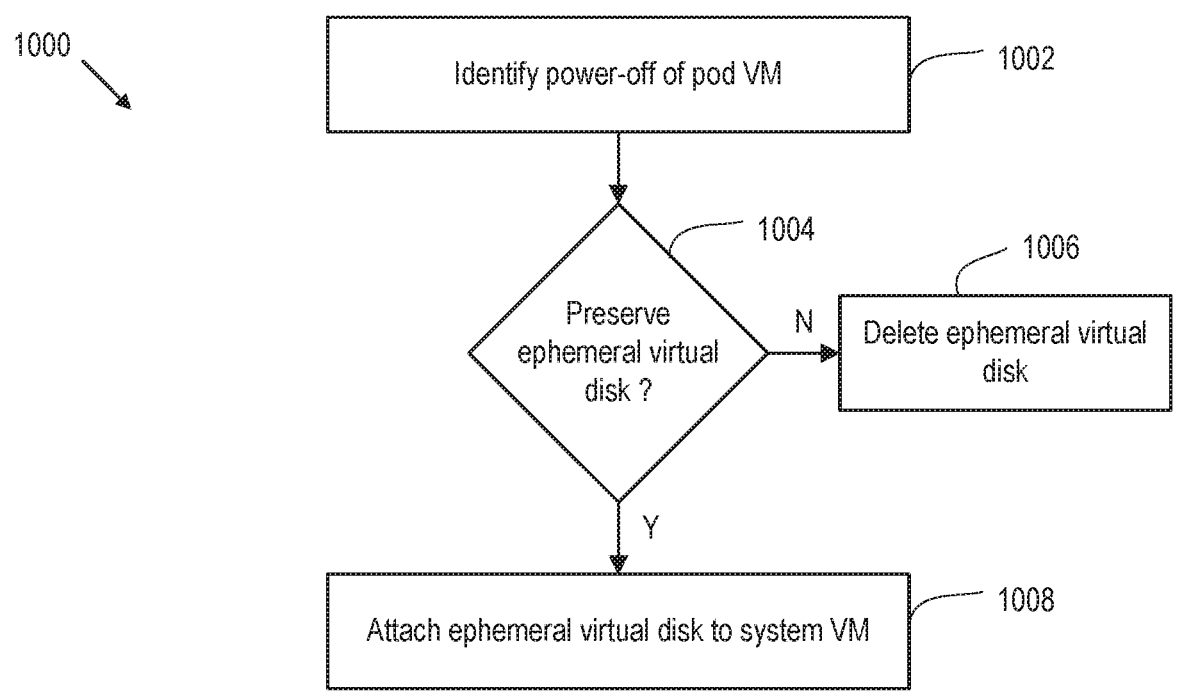
FIG. 10 is a flow diagram depicting a method of managing an ephemeral virtual disk after power-off of a pod VM according to an embodiment.

FIG. 10 is a flow diagram depicting a method 1000 of managing an ephemeral virtual disk after power-off of a pod VM according to an embodiment. Method 1000 can be performed by pod VM controller 216 executing in a virtualization layer on CPU, memory, storage, and network resources. Method 1000 can be performed to implement step 712 of method 700 described above.

Method 1000 begins at step 1002, where pod VM controller 216 identifies power-off of pod VM 130. At step 1004, pod N controller 216 determines whether to preserve ephemeral virtual disk 404. For example, a user can designate that ephemeral virtual disk 404 be preserved during pod creation or be preserved in case a container exits with a failure. A VI administrator can configure supervisor cluster 101 such that ephemeral virtual disks are preserved always or in case a container exits with a failure. If pod VM controller 216 determines ephemeral virtual disk 404 should be preserved, method 1000 proceeds to step 1008. Otherwise, method 1000 proceeds to step 1006, where pod VM controller 216 leaves ephemeral virtual disk for deletion by virtualization management server 116 during the pod VM destroy process. At step 1008, to preserve ephemeral virtual disk 404, pod VM controller 216 attaches ephemeral virtual disk 404 to a system VM 130/140 executing on host 120. In such case, when virtualization management server 116 instructs hypervisor 150 to destroy pod VM 130, hypervisor 150 does not delete ephemeral virtual disk 404, which is attached to a running VM 130/140. Ephemeral virtual disk 404 is preserved for access by a user through a system VM 130/140 (e.g., to access log files or other container ephemeral state).

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A virtualized computing system, comprising:
    a host cluster including hosts executing hypervisors directly on hardware platforms thereof, the hypervisors configured to support execution of virtual machines (VMs), the VMs including a pod VM, the pod VM including a container engine configured to support execution of containers in the pod VM, the pod VM including a first virtual disk attached thereto; and
    an orchestration control plane integrated with the hypervisors, the orchestration control plane including a master server in communication with a pod VM controller, the pod VM controller configured to execute in a first hypervisor of the hypervisors external to the VMs and configured to cooperate with a pod VM agent in the pod VM, the pod VM agent configured to generate root directories for the containers in the pod VM, each of the root directories comprising a union of a read/write ephemeral layer and a read-only layer, the read/write ephemeral layer of each of the root directories stored on the first virtual disk.

2. The virtualized computing system of claim 1, wherein the first virtual disk has a filesystem with directories, each of the directories comprising the read/write ephemeral layer of a respective one of the root directories.

3. The virtualized computing system of claim 2, wherein the filesystem of the first virtual disk specifies a storage quota for a first directory of the directories.

4. The virtualized computing system of claim 3, wherein the pod VM agent is configured to set the storage quota for the first directory in response to at least one of a reservation and a limit, received from the master server, for a first container of the containers, the first directory comprising the read/write ephemeral layer of a first root directory of the root directories for the first container.

5. The virtualized computing system of claim 1, further comprising:
    second virtual disks storing container images for the containers, where the read-only layer of each of the root directories includes a directory tree formed from one or more image layers stored on a respective one of the second virtual disks.

6. The virtualized computing system of claim 1, wherein the master server is configured to provision the first virtual disk and size the first virtual disk in response to at least one of a reservation of ephemeral storage, a limit of ephemeral storage, or a default amount of ephemeral storage for each of the containers.

7. The virtualized computing system of claim 6, wherein the master server is configured to size the first virtual disk further in response to a size of an ephemeral volume shared by the containers.

8. A method of managing ephemeral storage for containers executing in a virtualized computing system, the virtualized computing system including an orchestration control plane and a host cluster, the host cluster having hosts executing hypervisors on hardware platforms thereof, the hypervisors configured to support execution of virtual machines (VMs), the orchestration control plane including a master server in communication with a pod VM controller, the pod VM controller configured to execute in a first hypervisor of the hypervisors external to the VMs, the method comprising:
    identifying, by the pod VM controller, deployment of a pod VM of the VMs, the pod VM including a container engine configured to support execution of the containers in the pod VM, the pod VM including a first virtual disk attached thereto, the pod VM including a pod VM agent configured to cooperate with the pod VM controller; and
    generating, by the pod VM agent, root directories for the containers in the pod VM, each of the root directories comprising a union of a read/write ephemeral layer and a read-only layer, the read/write ephemeral layer for each of the root directories stored on the first virtual disk.

9. The method of claim 8, wherein the first virtual disk has a filesystem with directories, each of the directories comprising the read/write ephemeral layer of a respective one of the root directories.

10. The method of claim 9, wherein the filesystem of the first virtual disk specifies a storage quota for a first directory of the directories.

11. The method of claim 10, further comprising:
    setting, by the pod VM agent, the storage quota for the first directory in response to at least one of a reservation and a limit, received from the master server, for a first container of the containers, the first directory comprising the read/write ephemeral layer of a first root directory of the root directories for the first container.

12. The method of claim 8, further comprising:
    attaching, by the pod VM controller to the pod VM, second virtual disks that store container images for the containers, where the read-only layer of each of the root directories includes a directory tree formed from one or more image layers stored on a respective one of the second virtual disks.

13. The method of claim 8, further comprising:
    detecting, by the pod VM controller, termination of the pod VM; and
    mounting a filesystem of the first virtual disk for access by a system VM executing in the host cluster.

14. The method of claim 8, further comprising:
    detecting, by the pod VM controller, termination of the pod VM; and
    deleting the first virtual disk.

15. A non-transitory computer readable medium comprising instructions to be executed in a computing device to cause the computing device to carry out a method of managing ephemeral storage for containers executing in a virtualized computing system, the virtualized computing system including an orchestration control plane and a host cluster, the host cluster having hosts executing hypervisors on hardware platforms thereof, the hypervisors configured to support execution of virtual machines (VMs), the orchestration control plane including a master server in communication with a pod VM controller, the pod VM controller configured to execute in a first hypervisor of the hypervisors external to the VMs, the method comprising:

identifying, by the pod VM controller, deployment of a pod VM of the VMs, the pod VM including a container engine configured to support execution of the containers in the pod VM, the pod VM including a first virtual disk attached thereto, the pod VM including a pod VM agent configured to cooperate with the pod VM controller; and generating, by the pod VM agent, root directories for the containers in the pod VM, each of the root directories comprising a union of a read/write ephemeral layer and a read-only layer, the read/write ephemeral layer for each of the root directories stored on the first virtual disk.

16. The non-transitory computer readable medium of claim 15, wherein the first virtual disk has a filesystem with directories, each of the directories comprising the read/write ephemeral layer of a respective one of the root directories.

17. The non-transitory computer readable medium of claim 16, wherein the filesystem of the first virtual disk specifies a storage quota for a first directory of the directories.

18. The non-transitory computer readable medium of claim 17, further comprising:

setting, by the pod VM agent, the storage quota for the first directory in response to at least one of a reservation and a limit, received from the master server, for a first container of the containers, the first directory comprising the read/write ephemeral layer of a first root directory of the root directories for the first container.

19. The non-transitory computer readable medium of claim 15, further comprising:

attaching, by the pod VM controller to the pod VM, second virtual disks that store container images for the containers, where the read-only layer of each of the root directories includes a directory tree formed from one or more image layers stored on a respective one of the second virtual disks.

20. The non-transitory computer readable medium of claim 15, further comprising:

detecting, by the pod VM controller, termination of the pod VM; and mounting a filesystem of the first virtual disk for access by a system VM executing in the host cluster.

\* \* \* \* \*